US008210758B2

(12) United States Patent
Gates et al.

(10) Patent No.: US 8,210,758 B2
(45) Date of Patent: Jul. 3, 2012

(54) GUIDING A HAND-OPERATED PRINTER

(75) Inventors: Ryan Christopher Gates, Lexington, KY (US); Gary Lee Noe, Lexington, KY (US); William Henry Reed, Lexington, KY (US); Michael David Stilz, Lexington, KY (US); Barry Baxter Stout, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 528 days.

(21) Appl. No.: 11/533,949

(22) Filed: Sep. 21, 2006

(65) Prior Publication Data
US 2008/0075512 A1    Mar. 27, 2008

(51) Int. Cl.
*B41J 3/36* (2006.01)

(52) U.S. Cl. .......................................... 400/88; 400/87

(58) Field of Classification Search .................... 400/88, 400/87
See application file for complete search history.

(56) References Cited

U.S. PATENT DOCUMENTS

| | | | | |
|---|---|---|---|---|
| 5,578,813 | A * | 11/1996 | Allen et al. | 250/208.1 |
| 5,927,872 | A * | 7/1999 | Yamada | 400/88 |
| 6,357,939 | B1 * | 3/2002 | Baron | 400/88 |
| 7,252,379 | B2 * | 8/2007 | Silverbrook | 347/109 |
| 7,328,996 | B2 * | 2/2008 | Walling | |
| 7,690,785 | B2 * | 4/2010 | Silverbrook | 347/109 |
| 2004/0021912 | A1 * | 2/2004 | Tecu et al. | 358/473 |
| 2004/0114200 | A1 * | 6/2004 | Cheung et al. | |
| 2004/0233242 | A1 * | 11/2004 | Patton et al. | |

* cited by examiner

*Primary Examiner* — Anthony Nguyen

(57) ABSTRACT

A method for use in guiding a hand-operated printer positioned over a print medium includes determining a position of the hand-operated printer relative to the print medium; and generating on a display screen a virtual image of at least a portion of an area under the hand-operated printer, corresponding to the position of the hand-operated printer.

17 Claims, 6 Drawing Sheets

GUIDING A HAND-OPERATED PRINTER

BACKGROUND OF THE INVENTION

1. Field of the Invention

The present invention relates to printing, and, more particularly, to methods and apparatuses used in guiding a hand-operated printer.

2. Description of the Related Art

A typical desktop ink jet printer is a stationary apparatus that includes a reciprocating printhead carrier that carries a printhead in a main scan direction, and includes a drive roller assembly that advances a print medium, e.g., paper, in a sub-scan direction relative to the printhead. To determine a printhead position relative to a print medium, a typical desktop ink jet printer includes an encoder strip running parallel to the main scan direction for determining the printhead position in the main scan direction, i.e., along the X-axis, and monitors the rotation of the drive roller assembly to determine an amount of print medium feed in the sub-scan direction, e.g., along the Y-axis.

Another type of printer is a hand-operated printer, also sometimes referred to as a hand-held printer or hand printer. In contrast to a desktop printer, a hand-operated printer is moved manually and randomly in its entirety relative to the print medium, such as paper or other surface to be printed, and does not include a drive mechanism for positioning a printhead relative to the print medium. In other words, the hand-operated printer is manually moved over the print medium by way of a motive force exerted via a user's hand.

The hand-operated printer senses the position on the print medium and activates printing whenever the area under the print element matches an unprinted section of a latent image, i.e., the portion of the image yet to be printed. An optical encoder typically is used to provide position feedback of relative motion between the hand-operated printer and the print medium. A hand-operated printer navigates by continually updating its position with calculations of data from sustained sampling of information.

Hand printing requires the printing of multiple swaths of print data over multiple passes of the hand-operated printer over the print medium to complete a document page. The user must overlap these swaths of print so that no portion of the page is unprinted. Failure to overlap the swaths results in leaving a void or print defect on the page. One type of hand-operated printer has guide markings on the side of the printer to indicate generally to the user the location of the print swath in relation to the print medium, but this is better at predicting the start position of print than aligning multiple swaths.

SUMMARY OF THE INVENTION

The invention, in one form thereof, is directed to a method for use in guiding a hand-operated printer positioned over a print medium. The method includes determining a position of the hand-operated printer relative to the print medium; and generating on a display screen a virtual image of at least a portion of an area under the hand-operated printer, corresponding to the position of the hand-operated printer.

The invention, in another form thereof, includes accessing a bitmap of print data representing an image to be printed by the hand-operated printer; and generating on a display screen, based on the bitmap of print data, a virtual image of at least a portion of an area under the hand-operated printer corresponding to a current position of the hand-operated printer relative to the print medium.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION OF THE INVENTION

Figure 1:
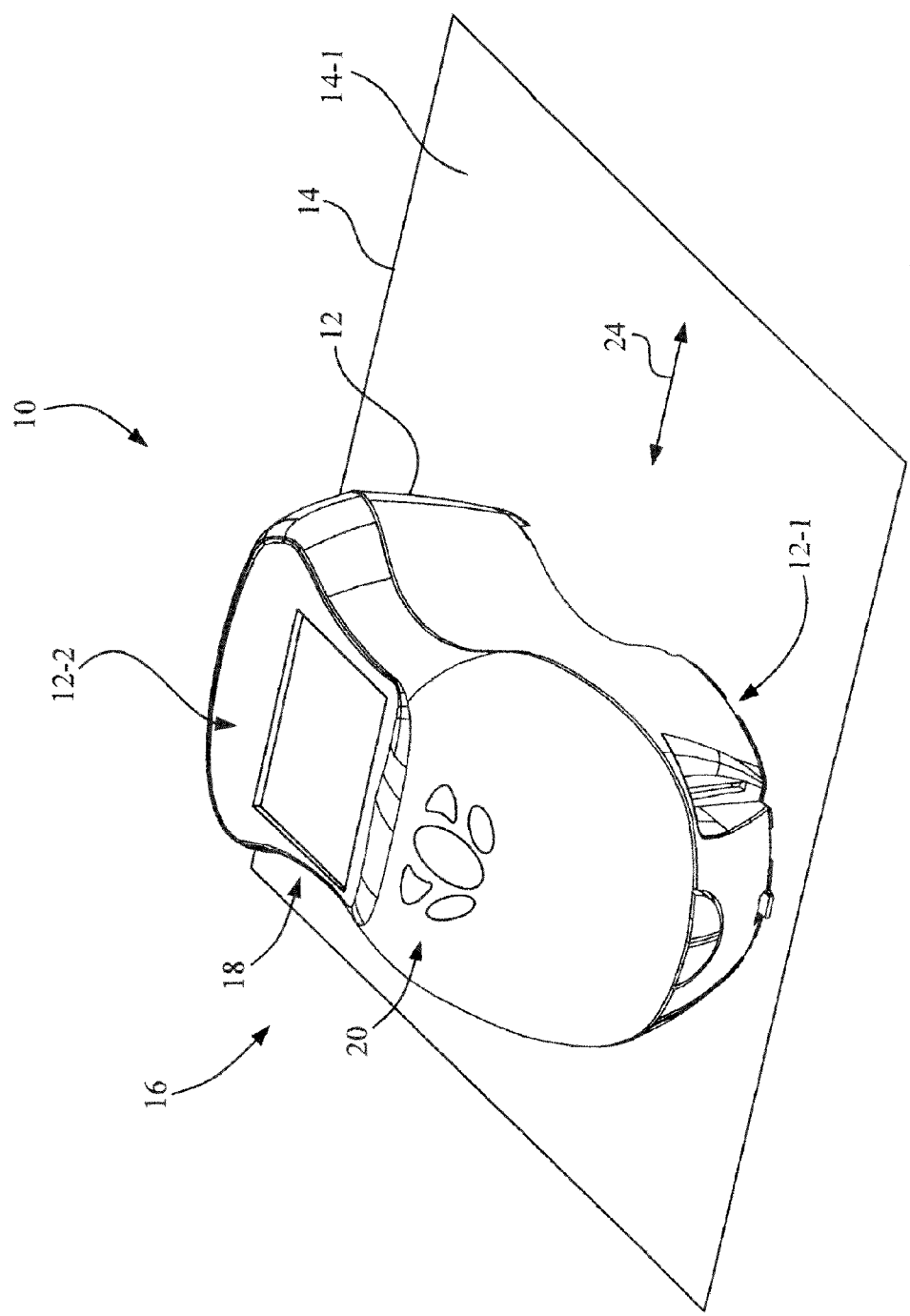
FIG. 1 is a perspective view of a hand-operated printer in accordance with an embodiment of the present invention.
Figure 2:
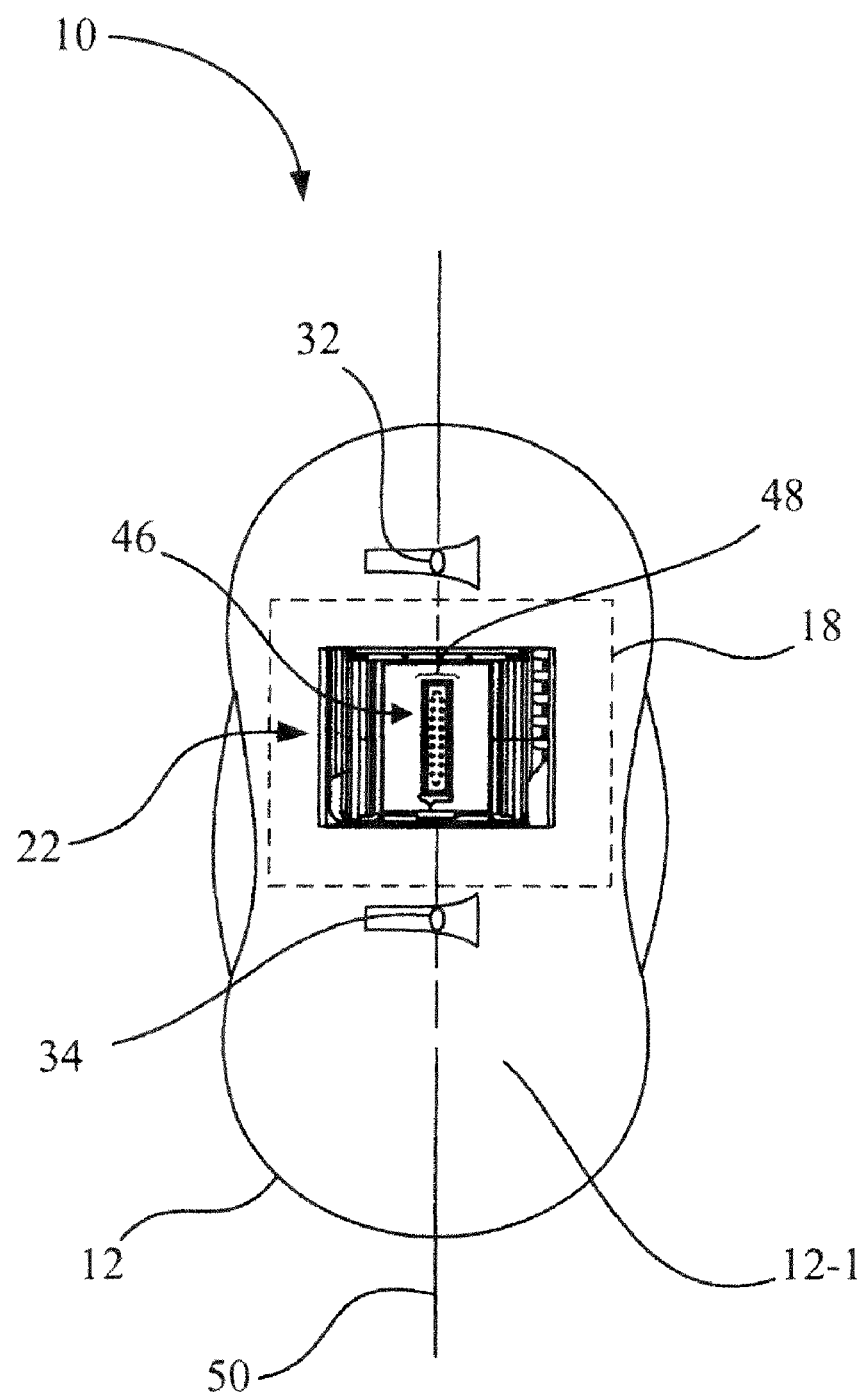
FIG. 2 is a bottom view of the hand-operated printer of FIG. 1.

As shown in FIGS. 1 and 2, hand-operated printer 10 includes a body 12. Body 12 is configured with a smooth bottom surface 12-1 that contacts a print medium 14, such as for example, a sheet of paper, transparency, card stock, fabric, hard surface, soft surface, etc. Accessible at a top surface 12-2 of hand-operated printer 10 is an operator panel 16 including a display screen 18 and a plurality of control buttons 20. A printing mechanism 22 is coupled to body 12, as illustrated in FIG. 2.

When hand-operated printer 10 is positioned over print medium 14, an area under hand-operated printer 10 is not visible to a user of hand-operated printer 10. In accordance with an embodiment of the present invention, as described in more detail below, a virtual image of an area under hand-operated printer 10 corresponding to the current position of hand-operated printer 10 is generated and displayed on display screen 18.

During a hand printing operation, as illustrated in FIG. 1, a user provides the motive force to provide movement of hand-operated printer 10 relative to print medium 14. Movement of the hand-operated printer 10 relative to print medium 14 along a scan path 24, e.g., a scan axis, results in relative movement of printing mechanism 22 with respect to a printing surface 14-1 of print medium 14 along scan path 24. The term "scan path" is intended to include both linear and non-linear movement of hand-operated printer 10. The smooth bottom surface 12-1 of body 12 contacts print medium 14 to provide the desired spacing between printing mechanism 22 and printing surface 14-1 of print medium 14. Alternatively, spacers or "feet" may be used to provide spacing between the print mechanism and the print medium.

Figure 3:
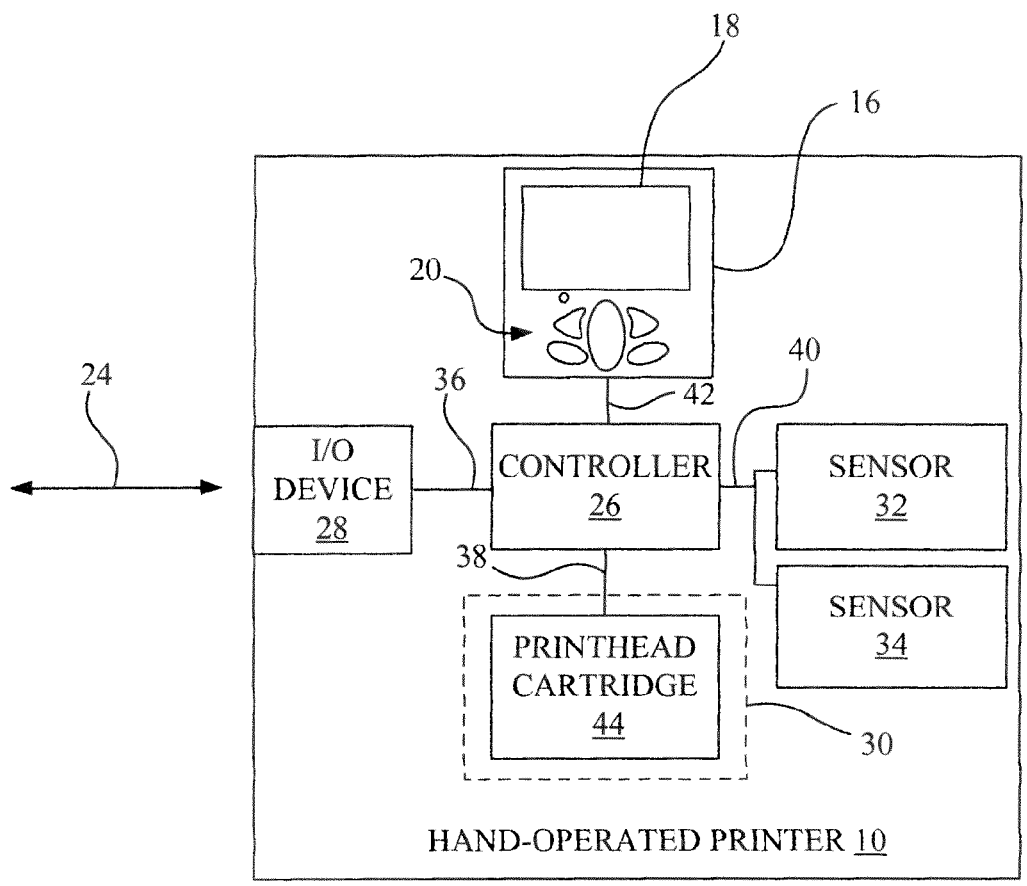
FIG. 3 is a general diagrammatic representation of the hand-operated printer of FIG. 1.

FIG. 3 is a general diagrammatic representation of hand-operated printer 10. Hand-operated printer 10 may be, for example, a hand-operated ink jet printer, and may include operator panel 16, a controller 26, an input/output (I/O) device 28, a cartridge receptacle 30, a first sensor 32, and a second sensor 34. Each of operator panel 16, controller 26, 110 device 28, cartridge receptacle 30, sensor 32, and sensor 34 are mounted to body 12.

As used herein, the terms "first" and "second" preceding an element name, e.g., first sensor, second sensor, etc., are used for identification purposes to distinguish between similar elements, and are not intended to necessarily imply order unless expressly stated, nor are the terms "first", "second", etc., intended to preclude the inclusion of additional similar elements, e.g., "third", "fourth", etc.

Controller 26 includes a processor unit and associated memory, and may be formed as one or more Application Specific Integrated Circuits (ASIC), Controller 26 executes program instructions to perform data processing and formatting, facilitate printing control, and/or facilitate device interaction with respect to one or more of a plurality of devices in communication with controller 26. Controller 26 is communicatively coupled to I/O device 28 via communications link 36. Controller 26 is communicatively coupled to cartridge receptacle 30 via a communications link 38. Controller 26 is communicatively coupled to each of sensors 32 and 34 via a communications link 40. Controller 26 is communicatively coupled to operator panel 16 via communications link 42.

As used herein, the term "communications link" generally refers to structure that facilitates electronic communication between components, and may operate using wired or wireless technology I/O device 28 may be configured in a variety of ways, depending on the source and/or destination of the communicated content. For example, I/O device 28 may be a wired, e.g., USB, or wireless, e.g., IEEE 802.XX, communication device that provides a communications link to a source of image content, such as for example, a memory card reader and associated memory card. Alternatively, I/O device 28 may provide a link to a host computer, or some other intelligent device, such as a digital camera, that may supply image data for printing by hand-operated printer 10.

Cartridge receptacle 30, for example, may be formed in body 12 and configured for receiving and mounting at least one printhead cartridge 44. Cartridge receptacle 30 holds printhead cartridge 44 in a fixed position relative to hand-operated printer 10. Printhead cartridge 44 is communicatively coupled to controller 26 via communications link 38. As shown in the example of FIG. 2, printhead cartridge 44 includes an ink jet printhead 46 including an array of ink jetting nozzles 48. Printhead cartridge 44 further includes a supply of ink.

Movement of the hand-operated printer 10 relative to print medium 14 results in relative movement of printhead cartridge 44 and ink jet printhead 46 with respect to printing surface 14-1 of print medium 14. The smooth bottom surface 12-1 of body 12 contacts print medium 14 to provide the desired spacing between ink jet printhead 46 and the printing surface 14-1 of print medium 14.

Referring again to FIG. 2, sensors 32 and 34 are positioned on the underside of hand-operated printer 10 and mounted to body 12. Each of sensors 32 and 34 is configured to sense movement in one or more directions in determining a position of hand-operated printer 10 relative to print medium 14. In the embodiment shown in FIG. 2, for example, sensors 32 and 34 are positioned spaced apart along a centerline 50 that passes through ink jet printhead 46, with inkjet printhead 46 being interposed between sensors 32 and 34. Alternatively, a printer may be configured with the sensors in other positions relative to the printhead.

During operation, sensors 32 and 34 are sampling continually, for example, hundreds or thousands of times a second. Those skilled in the art will recognize that additional sensors may be used, if desired. Each of sensors 32 and 34 detect movement by sensing small changes in the surface features of the surface being sensed, e.g., the surface roughness of printing surface 14-1 of print medium 14, or a discontinuity in print medium 14.

Referring to FIG. 3, each of sensors 32 and 34 is communicatively coupled to controller 26 via communications link 40. Each of sensors 32 and 34 may be, for example, a unitary optical sensor including a light source and a detector, each positioned to establish an angle of incidence, e.g., angle of reflection, with respect to the printing surface 14-1 of print medium 14. Each light source may include, for example, a light emitting diode (LED) emitting a predetermined color of light, and each detector may be, for example, an array of phototransistors whose voltage, or current, output varies as a function of the intensity of the reflected light that it receives. The output of each respective phototransistor of sensors 32 and 34 is processed by controller 26. From the sample information provided by sensors 32 and 34, controller 26 makes navigation calculations, e.g., controller 26 calculates a direction and distance of movement of hand-operated printer 10 to determine a position of hand-operated printer 10 relative to print medium 14.

For example, controller 26 executes program instructions to read output signals received from each of sensor 32 and sensor 34 to make navigation calculations. Navigation calculations may be made, for example, by a navigation program executing on controller 26. The navigation program may use, for example, trigonometric functions and geometric rules in converting vector information derived from the output of sensor 32 and sensor 34 into rectilinear information, e.g., X-Y information, or vice-versa.

Sensors 32 and 34 are located at a fixed location on hand-operated printer 10 and in a fixed relation to printing mechanism 22, e.g., ink jet printhead 46. Accordingly, by knowing the relative position of sensors 32 and 34 with respect to an object, e.g., previously printed text on print medium 14, it is possible to determine the relative position of printing mechanism 22, e.g., ink jet printhead 46, with respect to that same object.

If, for example, a user desires to print an image in the primary print mode, such as an image displayed on display screen 18, then hand-operated printer 10 is turned ON, and hand-operated printer 10 is moved relative to print medium 14 along scan path 24. Controller 26 controls ink jet printhead 46 to print the image on print medium 14 corresponding to the image selection made by the user. A distance of movement of hand-operated printer 10 in at least one direction is automatically sensed by sensors 32 and 34, and printing will commence to form an image on print medium 14 after hand-operated printer 10 has moved a predetermined distance to reach a designated print position. Each left to right, or right to left movement of hand-operated printer across print medium 14 is referred to herein as a pass. The area traced by printing mechanism 22, e.g., ink jet printhead 46, over print medium 14 for a given pass is referred to herein as a swath. A swath will follow a scan path of hand-operated printer 10, e.g., will follow scan path 24.

Referring to FIGS. 1-3, display screen 18 and control buttons 20 are communicatively coupled to controller 26 via communications link 42. Display screen 18 may include, for example, a liquid crystal display (LCD) screen having, for example, a resolution (height×width) of 81×101 pixels providing a virtual field of view. Display screen 18 may be a color display, or alternatively, a monochrome display. Control buttons 20 may be configured to control such functions as, for example, power-ON/OFF, print, menu display, select, cancel, etc. Of course, the number of buttons used may deviate from that illustrated in the exemplary embodiment of hand-operated printer 10 shown in FIGS. 1-3, depending on the actual configuration of the hand-operated printer and the applications for which the hand-operated printer may be used.

Figure 4:
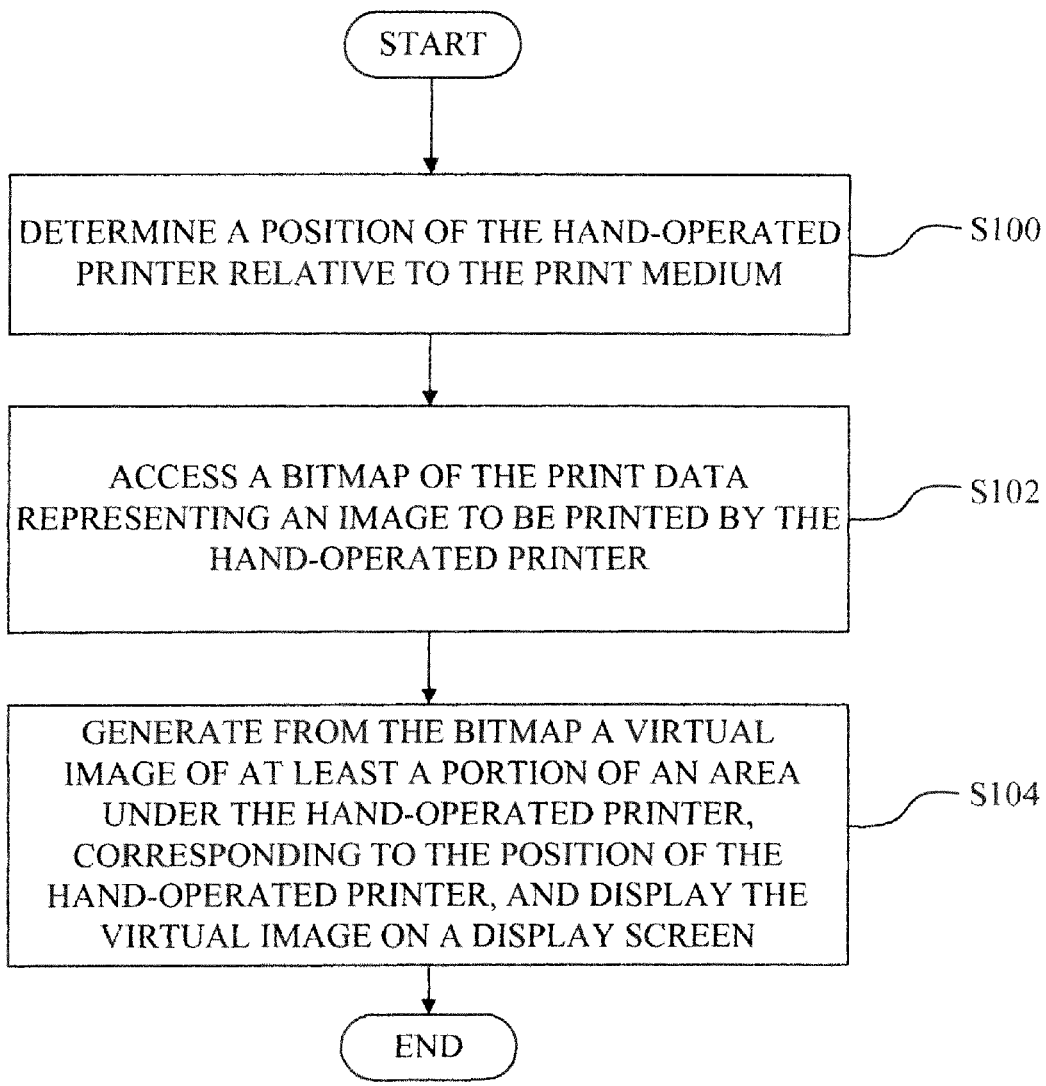
FIG. 4 is a flowchart of a method for use in guiding a hand-operated printer, in accordance with an embodiment of the present invention.

FIG. 4 is a flowchart of a method for use in guiding a hand-operated printer positioned over a print medium, in accordance with an embodiment of the present invention.

At step S100, a position of hand-operated printer 10 relative to print medium 14 is determined. The determination of the position of hand-operated printer is performed dynamically, such that a current position of hand-operated printer 10 will be known as hand-operated printer 10 is moved over print medium 10. The position of hand-operated printer 10 may be determined by controller 26 executing navigation program instructions to read output signals received from each of sensor 32 and sensor 34, and to make navigation calculations, as more fully described above.

Figure 5A:
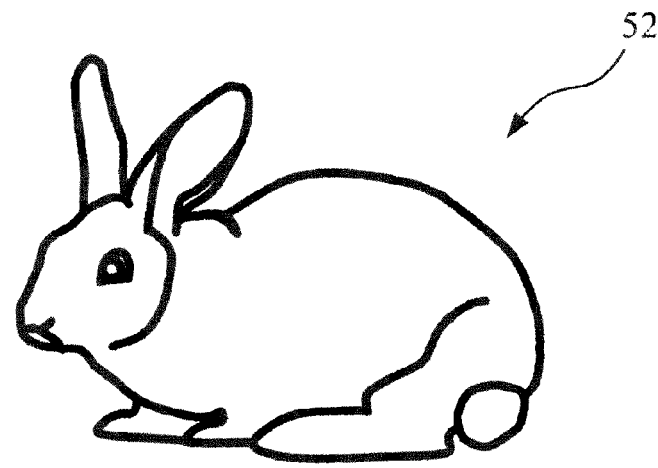
FIG. 5A shows an exemplary image to be printed.

At step S102, a bitmap of print data representing an image, e.g., image 52 (see FIG. 5A), to be printed by hand-operated printer 10 is accessed. The bitmap of the print data representing the image to be printed, e.g., at 600×600 dots per inch or some other desired resolution, may be stored, for example, in memory associated with controller 26, or may be stored in memory accessible by controller 26 via I/O device 28. The image to be printed may be, for example, text, graphics, symbols, pictures, or any combination thereof.

At step S104, a virtual image of at least a portion of an area under hand-operated printer 10, corresponding to the position of hand-operated printer 10, is generated and displayed on display screen 18. The area under hand-operated printer 10 corresponds to the footprint of hand-operated printer, i.e., corresponds to the size of bottom surface 12-1 as shown in FIG. 2. A position of display screen 18 with respect to bottom surface 12-1 is shown by dashed lines in FIG. 2.

Figure 5B:
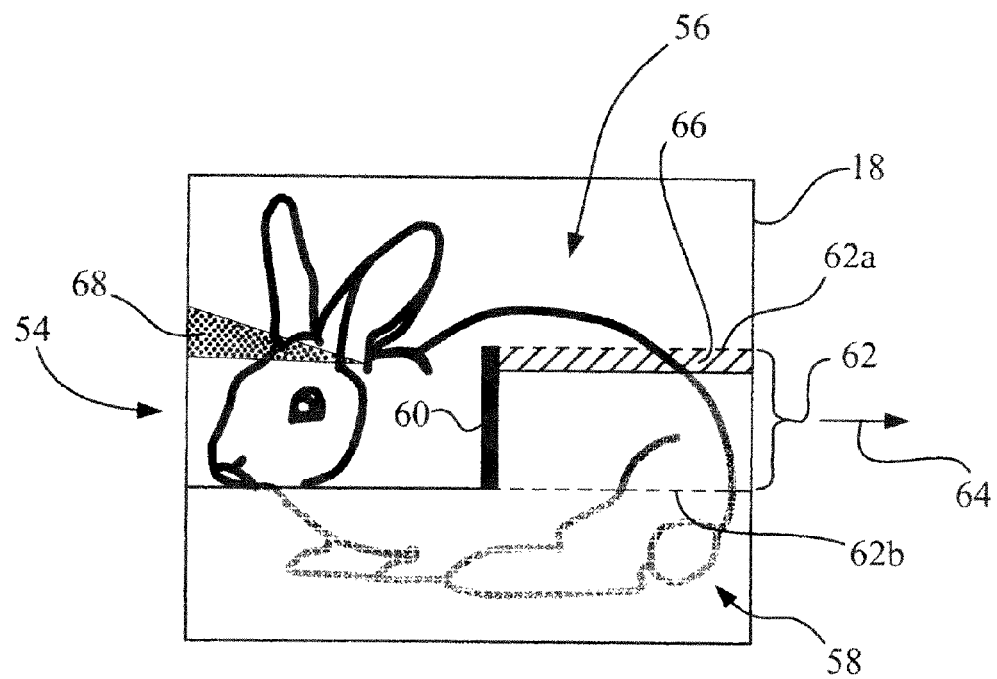
FIG. 5B shows an exemplary virtual image displayed on a display screen to simulate a view under the hand-operated printer of FIG. 1.

In accordance with an embodiment of the present invention, as illustrated, for example, in FIG. 5B, a virtual image 54 is generated from the bitmap of print data and is displayed on display screen 18 to simulate a view under hand-operated printer 10 and to provide to a user of hand-operated printer 10 accurate guidance information with respect to the best place to move hand-operated printer 10 relative to print medium 14 during a printing operation to aid in avoiding the creation of gaps, or to fill gaps, in the image as it is being printed on print medium 14. For example, by knowing the relative position of sensors 32 and 34 with respect to an object, e.g., previously printed picture or text portion, on print medium 14, and in turn knowing the relative position of printing mechanism 22, e.g., ink jet printhead 46, with respect to that same object, virtual image 54 may be generated and displayed on display screen 18 to alert the user of hand-operated printer 10 of the location of printing mechanism 22, e.g., ink jet printhead 46 relative to that same object, e.g., with respect to the location of a previously printed picture or text portion.

In the embodiment shown in FIGS. 1-3, for example, display screen 18 is positioned on hand-operated printer 10 directly over the print position represented by printing mechanism 22, e.g., ink jet printhead 46, so that display screen 18 functions as a virtual window for the user to see the print swath being created. In the present embodiment, a portion of only the area under hand-operated printer 10 that is out of the direct view of the user is displayed on display screen 18, and may be displayed at full size. Those skilled in the art will recognize that virtual image 54 may include more or less than the area under hand-operated printer 10, and may be size-reduced or size-expanded from the full size, if desired.

While the bitmap of print data representing image 52 may be accessed directly and displayed on a high resolution display screen, in the current embodiment, a separate display bitmap may be extracted from the bitmap of print data representing image 52 for display on display screen 18. As such, the display bitmap may be stored at lower resolution.

In the example shown in FIG. 5B, virtual image 54 includes a first virtual image portion 56 corresponding to a first actual image portion already printed on print medium 14 in the area under hand-operated printer 10, and a second virtual image portion 58 as a latent unprinted image portion, i.e., a preview of an actual image portion yet to be printed on print medium 14 in the area under hand-operated printer 10, in relation to a third virtual image portion 60 having a representation of printing mechanism 22, e.g., ink jet printhead 46, of hand-operated printer 10, i.e., the print zone 60 of hand-operated printer 10.

As such, virtual image 54 provides to a user a visual representation of the print data within the virtual field of view of display screen 18 that has been printed, and a visual representation of the corresponding image data within the virtual field of view of display screen 18 that has not yet been printed. Any has-been-printed information will be changed dynamically from second virtual image portion 58 to first virtual image portion 56 as individual pixels of the display bitmap are printed while hand-operated printer 10 moves over the target surface, i.e., printing surface 14-1 of print medium.

A projected swath 62 of printing mechanism 22 is illustrated by the region bounded by the pair of dashed swath projection lines 62a, 62b. The direction of projected swath 62 is shown by arrow 64, based on the direction of movement of hand-operated printer 10. A fourth virtual image portion 66 represents an overlap of a projection of the current swath 62 of printing mechanism 22 in direction 64 with first virtual image portion 56 representing the first actual image portion already printed on print medium 14.

As further shown in FIG. 5B, virtual image 54 may further include a warning indicia 68 that provides a visual warning to a user of hand-operated printer 10 of an unprinted region within first virtual image portion 56. As such, on a subsequent print swath, the user can align the third virtual image portion 60 having a representation of printing mechanism 22 such that swath projection lines 62a, 62b bound the region represented by warning indicia 68, and commence printing to fill the gap in the printed image on print medium 14. Once the gap is printed, then warning indicia 68 will be removed from display screen 18.

As the user moves hand-operated printer 10 to the right, for example, the displayed virtual image 54 will pan across the page of print medium 14, and print zone 60 will stay fixed in the center of display screen 18. In this example, as the printed content of first virtual image portion 56 exits the field of view of display screen 18, the printed text appears to the left of hand-operated printer 10 on the portion of print medium 14 emerging from under hand-operated printer 10.

In other words, virtual image 54 dynamically changes as hand-operated printer 10 is moved relative to print medium 14, and as such the size and location of first virtual image portion 56 and second virtual image portion 58 will dynamically change in accordance with the position of hand-operated printer 10 on print medium 14 and the amount of the image already printed. However, third virtual image portion 60 representing printing mechanism 22 is at a fixed location on display screen 18 which does not change with movement of hand-operated printer 10 as hand-operated printer 10 is moved relative to print medium 14.

It is to be understood that while first virtual image portion 56 and second virtual image portion 58 are shown for convenience as blocked areas, those skilled in the art will recognize that the lines of demarcation between first virtual image portion 56 and second virtual image portion 58 need not be shown. For example, first virtual image portion 56 may be displayed on display screen 18 having first visual characteristics, e.g., one or more of a first color (e.g., black) image, a first monochrome shade, a first color highlight, a first cross-hatching pattern, blinking, etc. Second virtual image portion 58 may be displayed on display screen 18 having second visual characteristics, e.g., a second color (e.g., blue), a second monochrome shade, a second color highlight, a second cross-hatching pattern, non-blinking, etc., different from said first visual characteristics.

Likewise, the region of overlap represented by fourth virtual image portion 66 is illustrated for convenience as spaced diagonal lines, but may be represented by still another unique visual characteristic, such as yellow, or some other unique designation. Identification of the overlap zone is very useful because the user will overlap the print swath, e.g., projected swath 62, slightly with the adjacent swath of already printed information from first virtual image portion 56 to prevent "voids" in the print on print medium 14. By the user knowing the amount of overlap, excessive overlap may be avoided, which would result in a higher total number of swaths in the print job, resulting in more work for the user and longer print times. This ability to "see" the expected amount of overlap at the print zone and projected swath 62 permits the user can better position hand-operated printer 10 during a printing operation.

Also, warning indicia 68 is shown as a dotted region, but may be represented by still another unique visual characteristic, such as red, or some other unique designation. For example, virtual image 54 displayed on display screen 18 may be modified to highlight missed areas of print, i.e., voids, and display the voids in a different color. FIG. 5B shows such an exemplary void as a dotted triangle of the image that was missed in both the previous print swath and a subsequent swath now displayed. Because positional error builds with navigational distance, it is desirable to repair voids as soon as possible to avoid mismatch from accumulated position error.

Figure 6A:
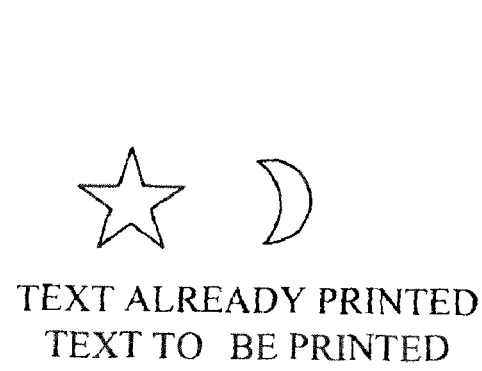
FIG. 6A shows another exemplary image to be printed.
Figure 6A:
Figure 6B:
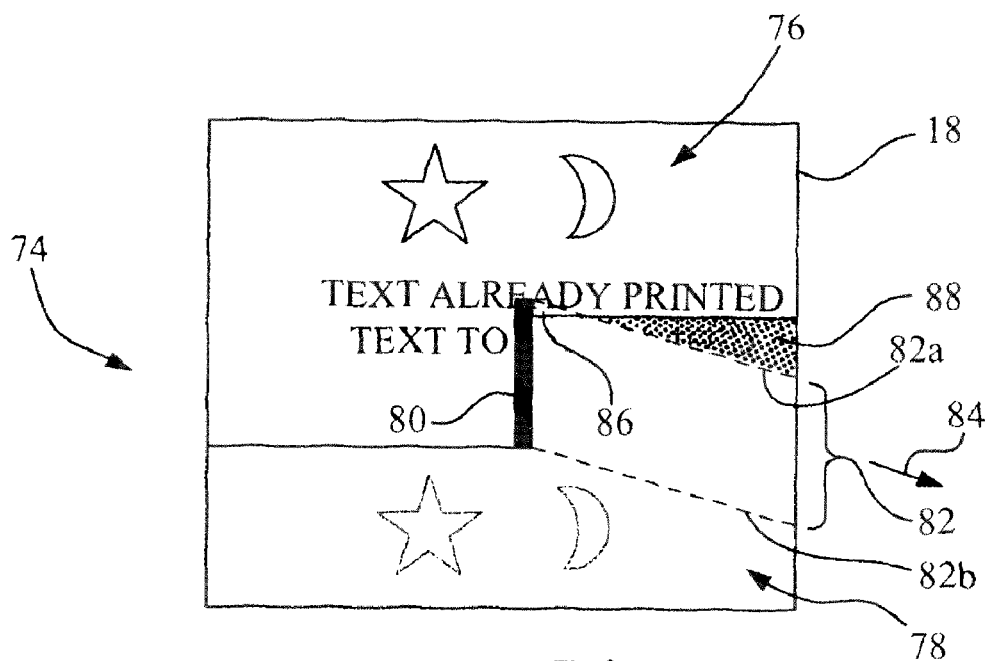
FIG. 6B shows another exemplary virtual image displayed on a display screen to simulate a view under the hand-operated printer of FIG. 1.

FIG. 6A shows another exemplary image 72 to be printed, and FIG. 6B shows a virtual image 74 generated on display screen 18. The bitmap of the print data representing image 72 to be printed may be stored, for example, in memory associated with controller 26, or may be stored in memory accessible by controller 26 via I/O device 28. Virtual image 74 is generated by controller 26 from the bitmap of print data and is displayed on display screen 18 to simulate a view under hand-operated printer 10.

In the example shown in FIG. 6B, virtual image 74 includes a first virtual image portion 76 corresponding to a first actual image portion already printed on print medium 14 in the area under hand-operated printer 10 and a second virtual image portion 78 as a preview of a second actual image portion yet to be printed on print medium 14 in the area, under hand-operated printer 10 in relation to a third virtual image portion 80 having a representation of printing mechanism 22, e.g., ink jet printhead 46, of hand-operated printer. As such, virtual image 74 provides to a user a visual representation of the print data within the virtual field of view of display screen 18 that has been printed, and a visual representation of the corresponding image data within the virtual field of view of display screen 18 that has not yet been printed.

A projected swath 82 of printing mechanism 22 is illustrated by the region bounded by the pair of dashed swath projection lines 82a, 82b. The direction of projected swath 82 is shown by arrow 84. An orientation of the projection of the current swath 82 is dependent on a direction of movement of said hand-operated printer 10.

A fourth virtual image portion 86 represents an overlap of a projection of the current swath 82 of printing mechanism 22 in direction 84 with first virtual image portion 76. Warning indicia 88 provides a visual warning to a user of hand-operated printer 10 if a projection of current swath 82 of hand-operated printer 10 moving in direction 84 does not overlap with the previously printed portion represented by first virtual image portion 76.

As such, the user can anticipate the potential formation of a gap in the printed image and take corrective action to align the third virtual image portion 80 having a representation of printing mechanism 22 such that swath projection lines 82a, 82b bound the region represented by warning indicia 88 so as to avoid the creation of a gap in the printed image on print medium 14. In other words, it is desirable to change the direction of movement of hand-operated printer 10 so as to reposition swath projection lines 82a, 82b to slightly overlap previously printed text in first virtual image portion 76. Once this redirection has occurred, warning indicia 88 is removed, and fourth virtual image portion 86 is extended to represent the new overlap of a new projection of the current swath 82 of printing mechanism 22 in direction 84 with first virtual image portion 76.

It is to be understood that while first virtual image portion 76 and second virtual image portion 78 are shown for convenience as blocked areas, those skilled in the art will recognize that the lines of demarcation between first virtual image portion 76 and second virtual image portion 78 need not be shown. For example, first virtual image portion 76 may be displayed on display screen 18 having first visual characteristics, e.g., a first color (e.g., black), a first monochrome shade, etc., and second virtual image portion 78 may be displayed on display screen 18 having second visual characteristics, e.g., a second color (e.g., blue), a second monochrome shade, etc., different from said first visual characteristics. Likewise, the region of overlap represented by fourth virtual image portion 86 may be represented by still another unique visual characteristic, such as yellow. Also, warning indicia 88 is shown as a dotted region, but may be represented by still another visual characteristic, such as red.

The implementation of the present invention as described above assumes hand-operated printer 10 is operating in an active printing mode. However, those skilled in the art will recognize that the principles of the present invention also may be used passively in a non-printing navigation mode to search the page to predetermine where print might be positioned, such as for example, whether there is enough room for the image to be printed or whether the image runs off the end of the paper. One benefit of a non-printing mode is the ability for the user to suspend navigation (for example, pressing a "pause" button) and reposition the displayed to-be-printed content to a more desired location on the page. This repositioning step shifts the coordinates of the image to-be-printed by the distance and direction the printer is moved while navigation is suspended. Such repositioning might be initiated to reduce skew of the image on the paper, to move the print area away from the edge of the paper, to avoid placing print on areas of the paper that might be spoiled if overprinted, and to better align new print with previous print.

While this invention has been described with respect to an embodiment of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for use in guiding a hand-operated printer having an integrated display screen and positioned over a print medium, comprising:
    determining a position of said hand-operated printer relative to said print medium; and
    generating on said integrated display screen a virtual image of at least a portion of an area under said hand-operated printer corresponding to said position of said hand-operated printer, wherein the virtual image includes a first virtual image portion corresponding to a first actual image portion already printed on said print medium in said area under said hand-operated printer and a second virtual image portion as a preview of a second actual image portion yet to be printed on said print medium in said area under said hand-operated printer.

2. The method of claim 1, wherein said virtual image dynamically changes as said hand-operated printer is moved relative to said print medium.

3. The method of claim 1, wherein said first virtual image portion is displayed on said display screen having first visual characteristics and said second image portion is displayed on said display screen having second visual characteristics different from said first visual characteristics.

4. The method of claim 1, wherein said virtual image includes a third virtual image portion having a representation of a printing mechanism of said hand-operated printer, said third virtual image portion being at a fixed location on said display screen which does not change with movement of said hand-operated printer, while said first virtual image portion and said second virtual image portion dynamically change as said hand-operated printer is moved relative to said print medium.

5. The method of claim 4, wherein said third virtual image portion includes at least one swath projection line extending from said representation of said printing mechanism.

6. The method of claim 1, wherein said virtual image includes a third virtual image portion having a representation of a printing mechanism of said hand-operated printer, and a fourth virtual image portion that represents an overlap of a projection of a current swath of said printing mechanism with said first virtual image portion.

7. The method of claim 6, wherein an orientation of said projection of said current swath is dependent on a direction of movement of said hand-operated printer.

8. The method of claim 1, wherein said virtual image includes warning indicia that provides a visual warning to a user of said hand-operated printer of an unprinted region within said first virtual image portion.

9. The method of claim 1, wherein said virtual image includes warning indicia that provides a visual warning to a user of said hand-operated printer if a projection of a current swath of said hand-operated printer does not overlap with said first virtual image portion.

10. The method of claim 1, wherein said virtual image is generated based on a bitmap of print data representing an image to be printed by said hand-operated printer.

11. A method for use in guiding a hand-operated printer having an integrated display screen and positioned over a print medium, comprising:
    accessing a bitmap of print data representing an image to be printed by said hand-operated printer; and
    generating on said integrated display screen, based on said bitmap of print data, a virtual image of at least a portion an area under said hand-operated printer corresponding to a current position of said hand-operated printer relative to said print medium, wherein said virtual image includes a first virtual image portion corresponding to a first actual image portion already printed on said print medium in said area under said hand-operated printer and a second virtual image portion as a preview of a second actual image portion yet to be printed on said print medium in said area under said hand-operated printer.

12. The method of claim 11, wherein said virtual image dynamically changes as said hand-operated printer is moved relative to said print medium.

13. The method of claim 11, wherein said first virtual image portion is displayed on said display screen having first visual characteristics and said second image portion is displayed on said display screen having second visual characteristics different from said first visual characteristics.

14. The method of claim 11, wherein said virtual image includes a third virtual image portion having a representation of a printing mechanism of said hand-operated printer, said third virtual image portion being at a fixed location on said display screen which does not change with movement of said hand-operated printer, while said first virtual image portion and said second virtual image portion dynamically change as said hand-operated printer is moved relative to said print medium.

15. The method of claim 14, wherein said third virtual image portion includes at least one swath projection line extending from said representation of said printing mechanism.

16. The method of claim 11, wherein said virtual image includes a third virtual image portion having a representation of a printing mechanism of said hand-operated printer, and a fourth virtual image portion that represents an overlap of a projection of a current swath of said printing mechanism with said first virtual image portion.

17. The method of claim 11, wherein said virtual image includes warning indicia that provides at least one of a visual warning to a user of said hand-operated printer of an unprinted region within said first virtual image portion, and a visual warning to said user of said hand-operated printer if a projection of a current swath of said hand-operated printer does not overlap with said first virtual image portion.

* * * * *